Nov. 22, 1938. E. AESCHBACH 2,137,558
DEVICE FOR DISCHARGING TROUGHS
Filed March 9, 1937 4 Sheets-Sheet 1
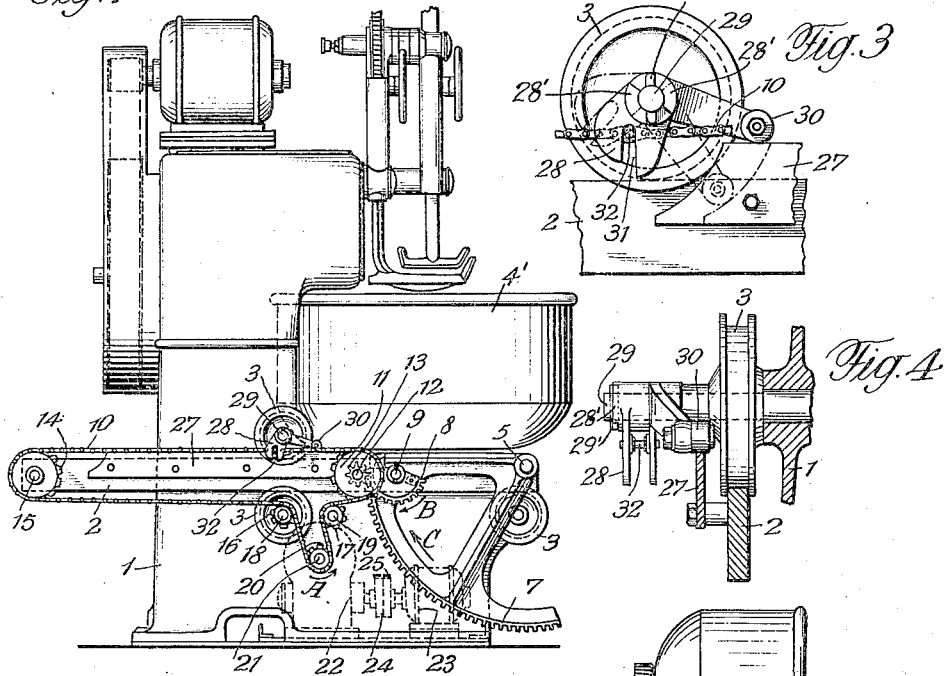
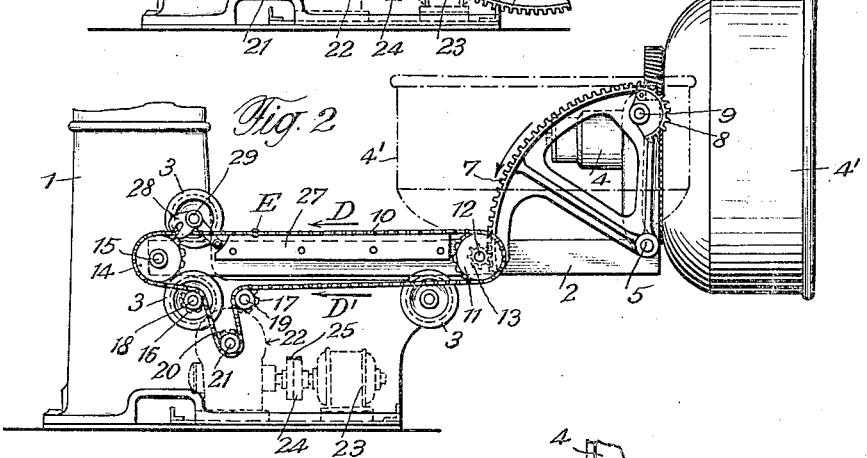
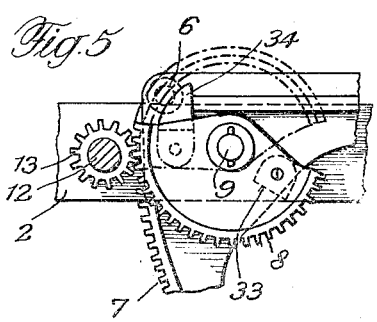
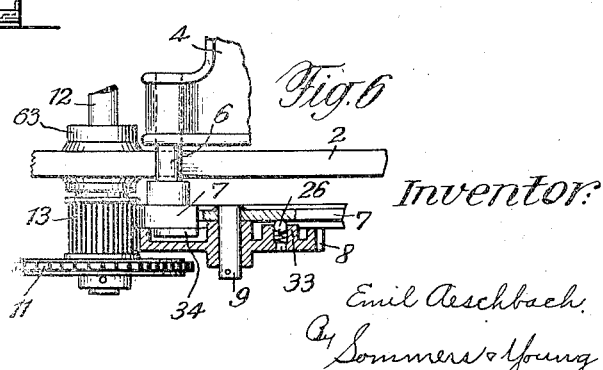
Inventor:
Emil Aeschbach
By Sommers & Young
Attys

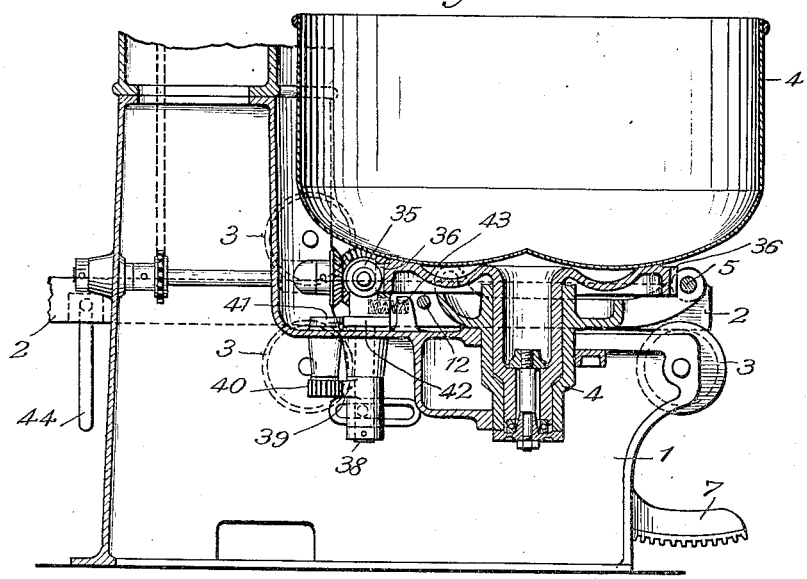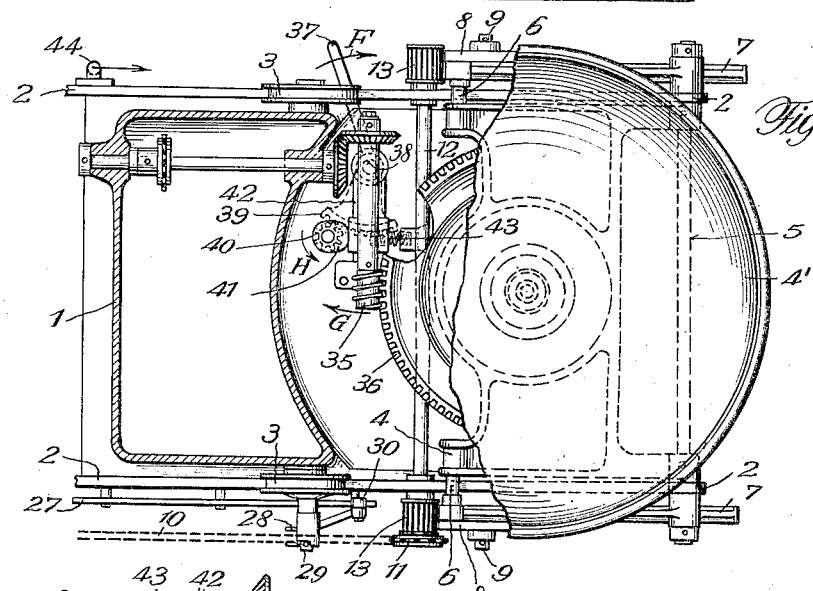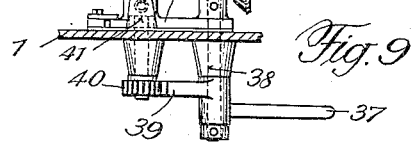

Nov. 22, 1938.    E. AESCHBACH    2,137,558
DEVICE FOR DISCHARGING TROUGHS
Filed March 9, 1937    4 Sheets-Sheet 3

Inventor:
Emil Aeschbach
By Sommers & Young
Attys

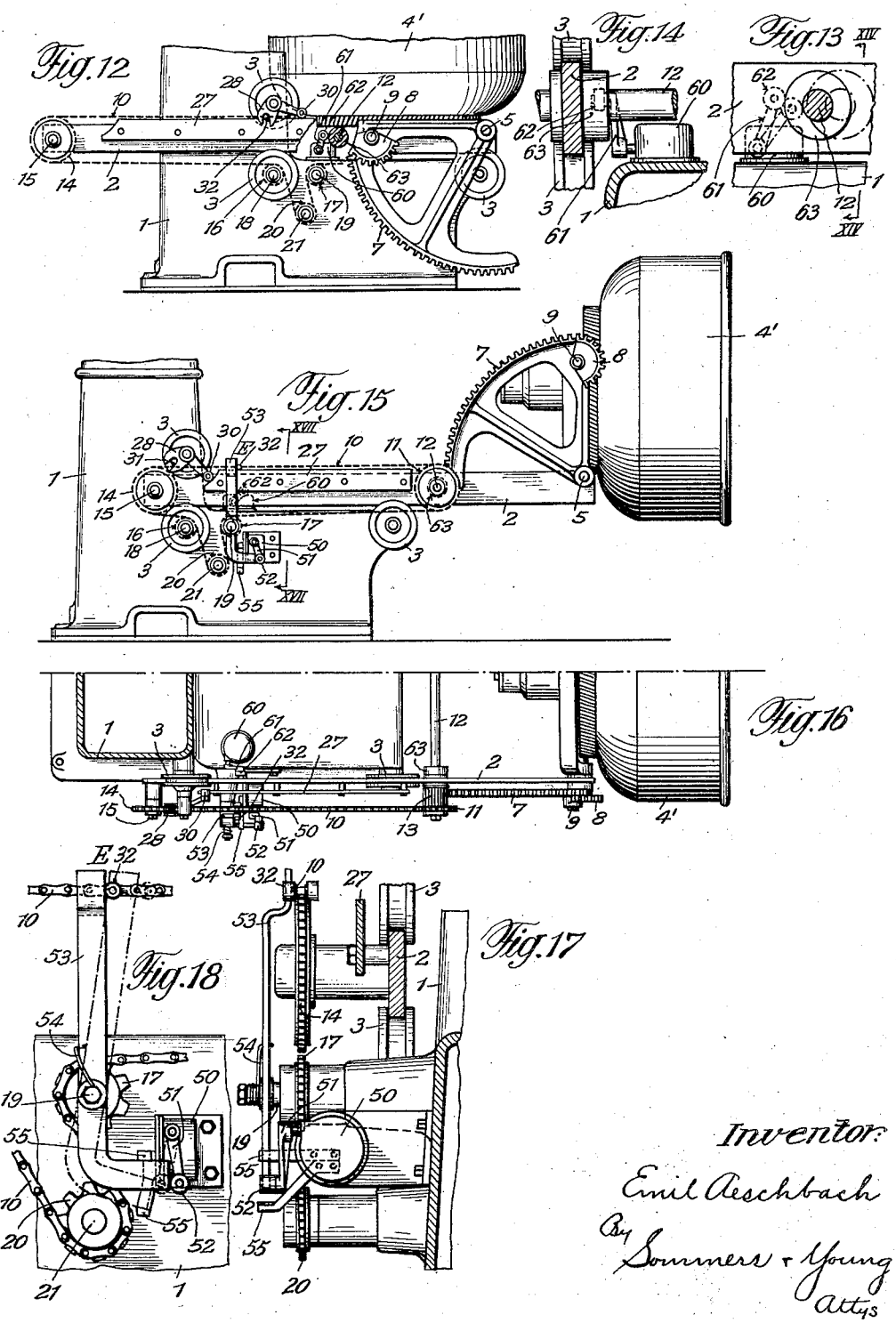

Patented Nov. 22, 1938

2,137,558

UNITED STATES PATENT OFFICE 2,137,558

DEVICE FOR DISCHARGING TROUGHS

Emil Aeschbach, Aarau, Switzerland, assignor to the firm F. Aeschbach A.-G., Aarau, Switzerland Application March 9, 1937, Serial No. 129,952
In Switzerland January 15, 1937

11 Claims. (Cl. 214—1.1)

This invention relates to devices for discharging the trough of machines, as mixing and kneading machines or the like.

In establishments, particularly of medium or large size, in which machines, as mixing and kneading machines or the like, are used, the necessity for automatically discharging the trough cooperating with the working means of the machine during the operation of the latter was felt long since.

In this connection, it is already known, to associate with a machine of this kind a number of troughs mounted on carriages and to wheel the same alternately, for working the material, in the machine and subsequently to remove the troughs from the machine again.

The present invention has for its object to use, for working the material in one and the same machine, continually the same trough and to automatically discharge the latter at the end of a working period into simpler and cheaper containers especially adapted for transporting the material.

For obtaining this result, according to the invention, a device for continually discharging one and the same trough comprises a trough carriage which is arranged for substantially horizontal extension away from the working position of the trough and at a forward point of which the trough is pivotally connected, and driving means for automatically successively extending said trough carriage and tilting the trough about its pivot axis in its extended position, and vice versa.

This device permits quick discharge of the material worked by the machine, in reliable manner, even from troughs of maximum content. The material may consist of a pulverized dry mixture of any kind suitable to be mechanically mixed in an open trough or of pasty material, for example, dough.

In the drawings two forms of the device, according to the invention, as applied to a kneading machine are illustrated, by way of example only, in which Fig. 1 shows a side elevation of the machine and of the associated device for automatically discharging the trough with the latter in retracted or working position;

Fig. 2 is a view similar to Fig. 1 but with the trough in extended and extremely tilted position;

Figs. 3 and 4 are larger scale elevational and sectional views respectively of a detail;

Figure 10:
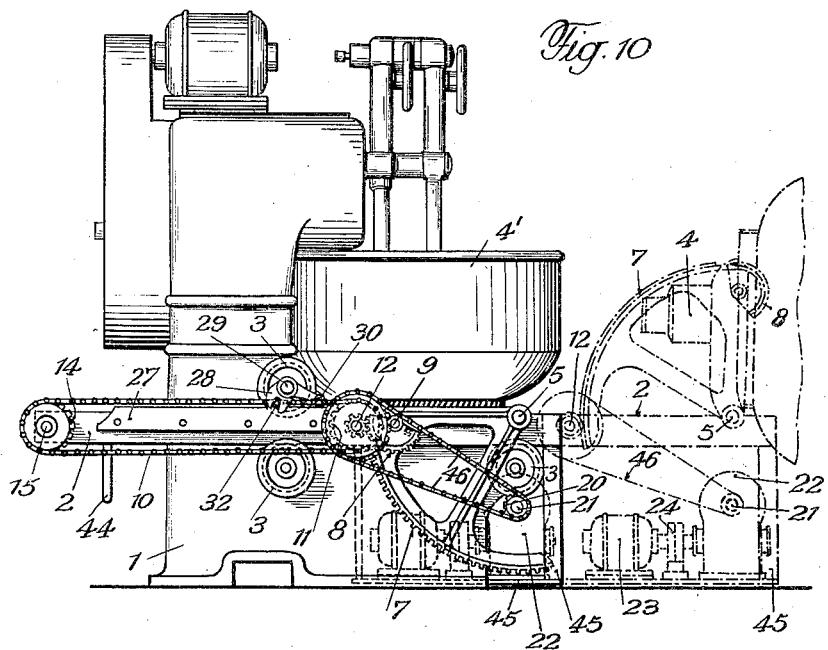
Figure 11:
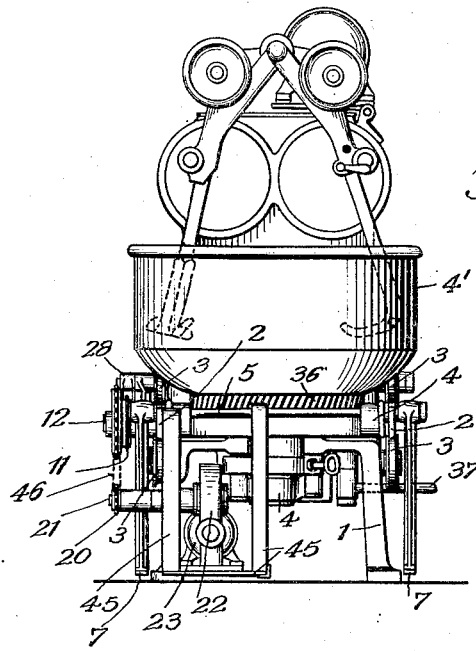

Figs. 5 and 6 each show a large scale elevation and sectional top plan view respectively of another detail;

Fig. 7 shows a vertical section of the machine and the device taken through the axis of the trough;

Fig. 8 shows a horizontal section taken through the base of the machine frame with the trough partly in top plan view;

Fig. 9 shows an elevation of a further detail;

Fig. 10 shows a side elevation of a second form of the device in association with a kneading machine;

Fig. 11 shows a front elevation of Fig. 10;

Fig. 12 shows an elevation of the machine base partly in section by the left carriage extension arm being broken out for exposing the inner movement limit switch of the carriage to view;

Fig. 13 is a larger scale view of a detail of Fig. 12;

Fig. 14 is a section on the line XIV—XIV of Fig. 13;

Fig. 15 shows an elevation of the machine base including the switching arrangement for limiting the tilting movement of the trough;

Fig. 16 is a partial plan view of Fig. 15;

Fig. 17 is a larger scale section on the line XVIII—XVIII of Fig. 15, and

Fig. 18 shows a front elevation of Fig. 17.

The first form, as shown in the Figs. 1 to 8, is provided with a trough carriage which is adapted to be wheeled in and out of the kneading machine independently of the driving motor and the drive gear of the driving means of the device for discharging the trough. The trough carriage is provided to the left and right of the base 1 of greater height than usual of the machine frame with an extension arm 2 which arms are each mounted on this base in three guide rolls 3, so as to be longitudinally displaceable in the transverse direction to the axis of the non-tilted trough. Two of the guide rolls 3 are arranged rearwardly of the trough at opposite points of the longitudinal edges of each arm 2, whereas the third guide roll bears forwardly on the base 1 against the lower longitudinal edge of the individual arm.

On the front portions of the arms 2, in opposite relation to the rear ends thereof, the trough of the kneading machine cooperating with the working means of the latter during the operation of said means is permanently mounted in a bolster 4 situated between the arms 2. In the front the bolster 4 rests against a pivot axle 5 which is mounted in the arms 2 so that its ends project outwardly from the latter. On each of these projecting ends a main toothed sector 7 is secured, so that by rotating these sectors the trough is tilted about the axle 5. In the non-tilted position of the trough, it is at the same time horizontally secured by pins 6 projecting inwardly from the main toothed sectors 7, the pins interconnecting these sectors with the bolster 4 and resting against the arms 2 in this position of the trough (Fig. 6).

On the main toothed sectors, in the vicinity of the points of connection thereof with the pins 6, outwardly projecting bearing pins 9 for pivotally carrying smaller auxiliary toothed sectors 8 are arranged which, as will be hereafter described, serve for initiating the tilting movement of the trough at the end of the forward longitudinal displacement of the carriage extension arms 2.

The driving means of the device are so constructed that they are adapted for automatically successively displacing the extension arms of the carriage in the longitudinal direction of these arms and tilting the trough about its pivot axis in the extended position of said trough, and vice-versa. To this end, the driving means are provided with a driving chain 10 which is passed round two guide chain wheels 11, 14 that are disposed forwardly and rearwardly on one of the arms 2 and are secured to a revoluble shaft 12 passing through both arms 2 and rotatably mounted on a bearing pin 15 secured to the left hand extension arm respectively. Between the chain wheel 11 and the left hand arm 2, on the shaft 12, a pinion 13 is secured (Fig. 6) which, due to the driving chain 10 being deflected toward the driving wheel 20 fastened to the driving end of the shaft 21 of the drive gear of the device, via a chain wheel 16, which is mounted on the bearing pin 18 of the guide roll 3, and a chain wheel 17, which is mounted on a bearing pin 19 in opposed relation to the chain wheel 16 as regards the forward direction, is positively actuated by the driving means of the device.

A worm drive 22 of the driving means is permanently operatively connected with an electric motor 23 by means of a disc coupling 24 providing at the same time a brake disk which cooperates with a braking member 25, so that incidental to disconnecting the electric supply circuit through the motor the latter is instantaneously stopped. An electric brake release magnet (not shown) which is included in this supply circuit operates to automatically release the brake 24, 25, when the motor is started again.

For effecting the longitudinal displacement of the carriage extension arms for moving the trough out of working position into extended position for tilting the latter in front of the kneading machine, on the left hand arm 2 a guide rail 27 is arranged to extend longitudinally thereof. On the bearing pin 29 of the upper one of the two guide rolls 3 situated at opposite points of the longitudinal edges of the left hand arm 2, a two armed anchorage lever 28 in the form of a bell crank lever is mounted for rocking between two end positions, this lever serving to anchor the chain 10 to the machine frame each time during the longitudinal displacing movements of the arms 2. In both of these end positions the bell crank lever 28 is positively arrested by cooperation of the respective side faces of two claws 28', formed on the outer side of this lever, with the opposed projecting ends of a cotter pin 29' passed through the outer end of the bearing pin 29 (Figs. 3 and 4). For effecting the anchorage of the chain 10 the lever 28 carries on its rear arm an open ended slot catch 31 extending with its open end towards the chain for cooperation with a stop 32 provided on the latter, for example, in the form of a bolt threadedly connected thereto. The outer end of the front arm of the lever 28 slides, when the bolt 32 is retained by the slot catch, on the guide rail 27, for example, through the intermediary of a guide roller 30 (Figs. 3 and 4), while the motor 23 turns the drive shaft 21 in the direction of arrow A in Fig. 1.

At the end of the forward longitudinal displacing movement of the carriage extension arms, the guide roller 30 of the lever 28 rides up, by the chain stop 32 bearing against the rear edge of the slot catch, on a curved abutment face provided on the rear end of the guide rail 27 so as to extend substantially arcuately about the fulcrum 29 of the anchorage lever in this position of the carriage arms (Fig. 2). By this means the stop 32 is released from engagement with the slot catch of the lever 28, whereupon the stop circulates in the direction of arrow D in Fig. 2 together with the chain 10 that keeps on moving. At the same time the trough carriage is secured against unintentional rearward displacement by the guide roller 30 cooperating with the curved abutment face.

During the time of the trough moving out of working position the chain wheel 11 has completed, by way of example, 1¼ revolutions and from thereon the chain stop 32 moves towards its end position E (Fig. 2). The pinion 13 which is fastened together with the wheel 11 on the common shaft 12 and was positively turned along as previously explained, has turned during this time the smaller auxiliary sector 8, meshing with it in the direction of arrow B in Fig. 1 to such an extent that at the end of the longitudinal displacement of the carriage arms, for advancing the trough, a driving abutment 33 provided on the sector 8 hits a mating drive starter abutment 34 on the main toothed sector 7.

As the motor 23 keeps on turning in the same direction of rotation, the auxiliary sector then raises the abutment 34 by means of the abutment 33, thereby rocking the toothed sector 7 in the direction of arrow C (Fig. 1) through an angle at the centre which corresponds to a circumferential portion devoid of gear teeth of this sector (Fig. 5). When, thereupon, the toothed portion of the main sector 7 cooperates with the gear teeth of the pinion 13, the latter maintains the rocking movement of the sector 7 and thereby the tilting of the trough until these two parts have arrived at their extreme positions as shown in Fig. 2. In the meantime the auxiliary toothed sector has moved out of mesh with the pinion 13 and has then retained its extreme rocking position relative to the main toothed sector by being locked in this relative position to the latter by a spring pressed locking ball 26 (Fig. 6) engaging into corresponding notch in the body of the sector 7. The interengagement of the gear teeth on the parts 7 and 13, therefore, takes place only at a certain moment following the end of the longitudinal displacement of the carriage for advancing the trough into extended position. When the trough arrives at its extreme tilting position, the motor 23 is disconnected, by means of a movement limit switch 50, and is simultaneously abruptly arrested by action of the brake release magnet. The limit switch 50, which is arranged on the left side of the machine base forwardly of the chain wheel 17 and at a level below the bearing pin 19 of the latter (Figs. 15 and 16), has a spring returned control arm 51 ending in a knob 52 which cooperates with the lower lever arm of a tappet 53. This tappet is rotatable about the axis of the pin 19 between two end positions limited by stops 55 (Figs. 15, 17 and 18) and is influenced by a spring 54 so as to be yieldingly retained in its inoperative position as indicated in chain dotted lines in Fig. 18. Incidental to the trough arriving in its extreme tilting position, the bolt 32 in turn arrives at its end position E (Figs. 2 and 18) in which it has shifted the tappet 53 into operative position, as shown in full lines in Figs. 15 and 18, so as to disconnect the switch 50, thereby disconnecting the motor 23 for arresting it abruptly, as mentioned above.

For the backward tilting of the trough into its chain dotted horizontal position (Fig. 2), the motor is changed-over to run in the opposite direction of rotation, so that the tappet 53 is released by the bolt 32 moving to the right in Fig. 15 and is thus permitted to reassume its inoperative position, by action of the spring 54, together with the spring-returned control arm 51 which thus connects the switch 50 again. At the same time toothed portions of the parts 7 and 13 begin to roll on each other and the auxiliary toothed segment 8 enters into engagement with the latter toothed portion again towards the end of this rolling movement. From thereon the sector 8 rocks back with regard to the sector 7 until the initial relative disposition of the two sectors is restored again which the sectors mutually assumed prior to the longitudinal displacement of the arms 2 for moving the trough into extended position. During the trough tilting backward the stop 32 has travelled back together with the chain 10 from its end position E, in the direction of the arrow D' in Fig. 2, until it hits the front edge of the slot catch on the anchorage lever incidental to the trough re-assuming its horizontal position by the pins 6 bearing against the arms 2, thus at the end of the backward tilting movement of the trough. In this way, this lever is reset into initial position in which it is checked by the respective side faces of the claws 28' bearing against the opposed projecting ends of the cotter pin 29' and thus firmly anchors the driving chain to the machine frame, whereupon the longitudinal displacement of the carriage for returning the trough into working position begins and ends, when the two toothed sectors 7 and 8 have re-assumed their initial relative disposition by operation of an inner movement limit switch 60 for the carriage. This switch is arranged on top of the machine base between the guide rails 27, in this instance, adjacent to the left rail 27 (Figs. 12 to 14 and 16) so that the control arm 61 thereof extends with an end knob 62 in the path of the inner hub portion of a bearing 63 (Fig. 6) by which the shaft 12 is guided in this rail. Incidental to the trough carriage arriving at its inner end position, the arm 61 has disconnected the switch 60 by having been moved by the bearing 63, into its dotted position to the left in Fig. 13. The chain dotted position of the bearing 63 as shown in this figure is the one which this bearing assumes immediately before hitting the arm 61. When the arm 61 has been rocked into its left hand position in Fig. 13 and thus has disconnected the switch 60, the motor 23 is set at rest. After a fresh charge of material has then been worked in the trough, the motor is connected again, whereupon the cycle of operations starting with effecting the forward longitudinal displacement of the trough begins anew.

At this time, all the movable parts of the device occupy their initial positions again which they assumed prior to the trough advancing into extended position for tilting, so that after a fresh supply of material has been worked by the working means of the machine the cycle of operations of the device, as described above, may be repeated.

The chain drive wheel 20 is operatively connected with the shaft 21 of the drive gear by means of a one-way clutch which has one-sidedly beveled clutch dogs and operates positively in the direction of running of the motor for moving the trough into extended position, but affords slippage in the opposite direction of movement with a view to eliminating the risk of inflicting damage to the machine.

For guiding the worm 35 for effecting the rotation of the trough, when this worm is disengaged from the worm wheel 36, while the trough is displaced, a setting mechanism is provided as evident from Figs. 7 to 9. A control lever 37, which is rockably mounted, at 38, in the base of the machine frame, is provided at its outer end with a control sector 39 which meshes with a pinion 40 which is also mounted in the machine base and the bearing pin of which carries on the upper side of the base a cam disc 41. This cam disc permits by turning in the sense of the arrow H in Fig. 8, when the control lever 37 is shifted in the direction of arrow F, that a spring 43, which acts on a bearing support 42 also mounted for rocking about the fulcrum 38, retracts this support and the worm together with it in the direction of arrow H away from the worm wheel 36. This spring then maintains the wheel 36 in the extreme rocking position of the same until after the arrival of the trough at its inner end position, for cooperation with the working means of the machine, the control lever is reset into its initial position, in the opposite direction to arrow F. The setting movement of the lever 37 is effected by a stop 44 arranged on the right hand arm 2, whereas the resetting movement of this lever is rather effected by hand for eliminating the risk of damaging of the machine.

In the second form of the device for discharging the trough of a kneading machine, according to the invention, as shown in the Figs. 10 and 11, the driving motor and the drive gear are disposed in a lower frame work 45 connected to the carriage for common movement therewith, instead of in the machine base. In this arrangement, a separate endless driving chain 46 slung about the drive wheel of the drive gear actuates the shaft 12 of the front guide wheel 11 of the driving chain 10. This construction of the device is of particular advantage in cases where an existing machine is to be equipped with a trough to be automatically discharged.

For controlling the movements, as the rotational movement of the trough about its axis, the movement for displacing the trough into extended position on the machine frame, the backward tilting movement of the trough etc., in this constructional example, as well as in the one previously described, push button switches are provided which may be applied to a wall of the working room and so forth.

I do not limit myself to the particular size, shape, number or arrangement of parts as shown and described, all of which may be varied without going beyond the scope of my invention as shown, described and claimed.

What I claim is:

1. In devices for discharging the troughs of machines, such as mixing and kneading machines, particularly bread mixing machines, a trough, an extensible trough carriage displaceable relative to the working position of said trough, means pivotally connecting said trough to said carriage forwardly of the latter, circulatory driving means common to said trough and said carriage for automatically successively extending said carriage and tilting said trough about its pivot axis in the extended position of said carriage into terminal position of said trough, and vice versa, means for automatically temporarily anchoring said circulatory driving means to a stationary point for effecting the displacements of said carriage by transforming the circulatory movement of said driving means to a translatory movement concomitant with the respective displacing movement of said carriage, and means for automatically releasing said driving means from said anchorage for effecting the tilting movements of said trough.

2. In devices for discharging the troughs of machines, such as mixing and kneading machines, particularly bread mixing machines, a trough, a trough carriage, extension arms on said carriage longitudinally displaceably arranged in substantially horizontal direction, means pivotally connecting said trough to said carriage opposite the rear ends of said arms, a flexible endless driving means common to said trough and said arms for automatically successively extending said arms longitudinally thereof away from the working position of said trough and tilting said trough about its pivot axis in the extended position of said arms into terminal position of said trough, and vice versa, means for automatically temporarily anchoring said endless driving means to a stationary point for effecting the displacements of said carriage by transforming the circulatory movement of said driving means to a translatory movement concomitant with the respective displacing movement of said carriage, and means for automatically releasing said driving means from said anchorage for effecting the tilting movements of said trough.

3. In a device for discharging the trough of machines, as mixing and kneading machines, particularly bread mixing machines, a machine frame, a trough, a trough carriage, extension arms on said carriage longitudinally displaceably guided by said frame in substantially horizontal direction, means pivotally connecting said trough to said carriage opposite the rear ends of said arms, an endless driving chain for automatically successively extending said arms longitudinally thereof away from the working position of said trough and tilting said trough about its pivot axis in the extended position of said carriage, and vice versa, two guide rolls for said chain disposed forwardly and rearwardly respectively on one of said extension arms, and means for anchoring said chain to said frame during the longitudinal displacements of said arms.

4. In a device for discharging the trough of machines, as mixing and kneading machines, particularly bread mixing machines, a machine frame, a trough, a trough carriage, extension arms on said carriage longitudinally displaceably guided by said machine frame in substantially horizontal direction, means pivotally connecting said trough to said carriage opposite the rear ends of said arms, an endless driving chain for automatically successively extending said arms longitudinally thereof away from the working position of said trough and tilting said trough about its pivot axis in the extended position of said carriage, and vice versa, two guide rolls for said chain disposed forwardly and rearwardly respectively on one of said extension arms, a guide rail connected to said first extension arm in collateral relation, an anchorage lever rockably mounted on said frame, a rear lever arm, a slot catch comprised by said rear lever arm, a stop provided on said chain for cooperation with the slot of said catch, and a front lever arm sliding with its front end on said guide rail, when said stop cooperates with said catch.

5. In a device for discharging the trough of machines, as mixing and kneading machines, particularly bread mixing machines, a machine frame, a trough, a trough carriage, extension arms on said carriage longitudinally displaceably guided by said frame in substantially horizontal direction, means pivotally connecting said trough to said carriage opposite the rear ends of said arms, an endless driving chain for automatically successively extending said arms longitudinally thereof away from the working position of said trough and tilting said trough about its pivot axis in the extended position of said carriage, and vice versa, two guide rolls for said chain disposed forwardly and rearwardly respectively on one of said extension arms, a guide rail connected to said first extension arm in collateral relation, a curved abutment face provided on the rear end of said guide rail, an anchorage lever rockably mounted on said frame, a rear lever arm, a slot catch comprised by said rear lever arm, a stop provided on said chain for cooperation with the slot of said catch, and a front lever arm rockingly cooperating at the end of the extending movement of said extension arms by pressure exertion of said stop on the rear slot edge of said catch with said abutment face then extending arcuately about the fulcrum of said lever, thereby securing said carriage against rearward motion.

6. In a device for discharging the trough of machines, as mixing and kneading machines, particularly bread mixing machines, a trough, a trough carriage arranged for substantially horizontal extension away from the working position of the trough, means pivotally connecting said trough to said carriage forwardly of the latter, driving means for automatically successively extending said trough carriage and tilting said trough about its pivot axis in the extended position of said carriage and vice versa, a main toothed sector commonly rockable with said trough about said pivot axis, a smaller auxiliary toothed sector rockably supported by said main sector for idly rocking relative thereto into driving engagement therewith and back into inoperative position again during the extending and resetting movements of said carriage respectively, and a pinion positively driven by said driving means, intermeshing with said auxiliary toothed sector substantially for the duration of said extending movement for initiating the tilting of said trough by virtue of said driving engagement between said auxiliary sector and said main sector, and intermeshing with said main sector substantially only during the tilting movements of said trough during which said auxiliary sector remains in driving engagement with said main sector, until it intermeshes with said pinion again for rocking back into said inoperative position.

7. In a device for discharging the trough of machines, as mixing and kneading machines, particularly bread mixing machines, a trough, a trough carriage arranged for substantially horizontal extension away from the working position of the trough, means pivotally connecting said trough to said carriage forwardly of the latter, driving means for automatically successively extending said trough carriage and tilting said trough about its pivot axis in the extended position of said carriage, and vice versa, a main toothed sector commonly rockable with said trough about said pivot axis, a drive starter abutment on said main sector, a smaller auxiliary toothed sector rockably supported by said main sector, a driving abutment on said auxiliary sector hitting said drive starter abutment at the end of the extending movement of said carriage for rocking said main sector, by action of said auxiliary sector for tilting said trough, and a pinion positively driven by said driving means intermeshing with said main sector by action of said drive starter abutment for maintaining the rocking movement of said main sector started by said auxiliary sector and releasing the latter from engagement with said pinion.

8. In a device for discharging the trough of machines, as mixing and kneading machines, particularly bread mixing machines, a machine frame, a trough, a trough carriage, extension arms on said carriage longitudinally displaceably guided by said frame in substantially horizontal direction, means pivotally connecting said trough to said carriage opposite the rear ends of said arms, an endless driving chain for automatically successively extending said arms longitudinally thereof away from the working position of said trough and tilting said trough about its pivot axis in the extended position of said carriage, and vice versa, two guide rolls for said chain disposed forwardly and rearwardly respectively on one of said extension arms, a guide rail connected to said first extension arm in collateral relation, a curved abutment face provided on the rear end of said guide rail, an anchorage lever rockably mounted on said frame, a rear lever arm, a slot catch formed on said rear lever arm, a stop provided on said chain for cooperation with the slot of said catch, a front lever arm cooperating at the end of said extending movement of said extension arms by pressure exertion of said stop on the rear slot edge of said catch with said abutment face, whilst said stop is released by said catch, and means positively operatively connected with said chain for tilting said trough while said released stop circulates together with said chain away from said lever.

9. In a device for discharging the trough of machines, as mixing and kneading machines, particularly bread mixing machines, a machine frame, a trough, a trough carriage, extension arms on said carriage longitudinally displaceably guided by said frame in substantially horizontal direction, means pivotally connecting said trough to said carriage opposite the rear ends of said arms, an endless driving chain for automatically successively extending said arms longitudinally thereof away from the working position of said trough and tilting said trough about its pivot axis in the extended position of said carriage, and vice versa, two guide rolls for said chain disposed forwardly and rearwardly respectively on one of said extension arms, a guide rail connected to said first extension arm in collateral relation, an anchorage lever rockably mounted on said frame, a rear lever arm, a slot catch formed on said rear lever arm, a stop provided on said chain for cooperation with the slot of said catch, a front lever arm, and means positively operatively connected with said chain for backwardly tilting said trough while said stop circulates together with said chain towards said lever for hitting the front slot edge of said catch for rocking said lever into position of retaining said stop by said catch.

10. In devices for discharging the troughs of machines, such as mixing and kneading machines, particularly bread mixing machines, a machine frame, a trough, an extensible trough carriage displaceable relative to the working position of said trough, means pivotally connecting said trough to said carriage forwardly of the latter, a flexible endless driving means common to said trough and said carriage for automatically successively extending said carriage and tilting said trough about its pivot axis in the extended position of said carriage into terminal position of said trough, and vice versa, means for automatically temporarily anchoring said endless driving means to a stationary point for effecting the displacements of said carriage by transforming the circulatory movement of said driving means to a translatory movement concomitant with the respective displacing movement of said carriage, means for automatically releasing said driving means from said anchorage for effecting the tilting movements of said trough, and a drive gearing for said driving means stationarily mounted on said machine frame on the side of said driving means remote from said stationary point.

11. In devices for discharging the troughs of machines, such as mixing and kneading machines, particularly bread mixing machines, a machine frame, a base formed on said frame, a trough, an extensible trough carriage displaceable relative to the working position of said trough, means pivotally connecting said trough to said carriage forwardly of the latter, a flexible endless driving means common to said trough and said carriage for automatically successively extending said carriage and tilting said trough about its pivot axis in the extended position of said carriage into terminal position of said trough, and vice versa, means for automatically temporarily anchoring said endless driving means to a stationary point for effecting the displacements of said carriage by transforming the circulatory movement of said driving means to a translatory movement concomitant with the respective displacing movement of said carriage, means for automatically releasing said driving means from said anchorage for effecting the tilting movements of said trough, a drive gearing for said driving means, and a lower supporting structure for said gearing fixed to said carriage and forming an annex to said base.

EMIL AESCHBACH.